(12) United States Patent
Yadav

(10) Patent No.: US 9,143,525 B2
(45) Date of Patent: *Sep. 22, 2015

(54) INTEGRATED NETWORK INTRUSION DETECTION

(71) Applicant: Intel Corporation, Santa Clara, CA (US)

(72) Inventor: Satyendra Yadav, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/300,420

(22) Filed: Jun. 10, 2014

(65) Prior Publication Data

US 2015/0058914 A1 Feb. 26, 2015

Related U.S. Application Data

(63) Continuation of application No. 12/649,018, filed on Dec. 29, 2009, now Pat. No. 8,752,173, which is a continuation of application No. 11/702,908, filed on Feb. 5, 2007, now abandoned, which is a continuation of application No. 10/066,140, filed on Feb. 1, 2002, now Pat. No. 7,174,566.

(51) Int. Cl.
*H04L 29/06* (2006.01)

(52) U.S. Cl.
CPC .......... *H04L 63/145* (2013.01); *H04L 63/0227* (2013.01); *H04L 63/1408* (2013.01); *H04L 63/0218* (2013.01)

(58) Field of Classification Search
None
See application file for complete search history.

(56) References Cited

U.S. PATENT DOCUMENTS

| | | | |
|---|---|---|---|
| 5,623,601 A * | 4/1997 | Vu | 726/12 |
| 5,787,409 A * | 7/1998 | Seiffert et al. | 706/45 |
| 6,219,706 B1 * | 4/2001 | Fan et al. | 709/225 |
| 6,301,668 B1 * | 10/2001 | Gleichauf et al. | 726/25 |
| 6,400,707 B1 * | 6/2002 | Baum et al. | 370/352 |
| 6,546,493 B1 * | 4/2003 | Magdych et al. | 726/25 |
| 6,725,377 B1 * | 4/2004 | Kouznetsov | 726/23 |
| 6,816,903 B1 * | 11/2004 | Rakoshitz et al. | 709/226 |
| 6,973,577 B1 * | 12/2005 | Kouznetsov | 726/25 |
| 7,069,330 B1 * | 6/2006 | McArdle et al. | 709/229 |
| 7,150,045 B2 * | 12/2006 | Koelle et al. | 726/26 |
| 7,171,688 B2 * | 1/2007 | Boom | 726/22 |
| 7,174,566 B2 * | 2/2007 | Yadav | 726/26 |
| 7,181,768 B1 * | 2/2007 | Ghosh et al. | 726/23 |
| 2002/0069356 A1 * | 6/2002 | Kim | 713/160 |

(Continued)

*Primary Examiner* — Michael R Vaughan
(74) *Attorney, Agent, or Firm* — Barnes & Thornburg LLP

(57) ABSTRACT

Intrusion preludes may be detected (including detection using fabricated responses to blocked network requests), and particular sources of network communications may be singled out for greater scrutiny, by performing intrusion analysis on packets blocked by a firewall. An integrated intrusion detection system uses an end-node firewall that is dynamically controlled using invoked-application information and a network policy. The system may use various alert levels to trigger heightened monitoring states, alerts sent to a security operation center, and/or logging of network activity for later forensic analysis. The system may monitor network traffic to block traffic that violates the network policy, monitor blocked traffic to detect an intrusion prelude, and monitor traffic from a potential intruder when an intrusion prelude is detected. The system also may track behavior of applications using the network policy to identify abnormal application behavior, and monitor traffic from an abnormally behaving application to identify an intrusion.

20 Claims, 8 Drawing Sheets

(56) References Cited

U.S. PATENT DOCUMENTS

| | | | |
|---|---|---|---|
| 2002/0087882 A1* | 7/2002 | Schneier et al. | 713/201 |
| 2002/0129264 A1* | 9/2002 | Rowland et al. | 713/200 |
| 2002/0129278 A1* | 9/2002 | Elgressy et al. | 713/201 |
| 2003/0084329 A1* | 5/2003 | Tarquini | 713/200 |
| 2003/0101353 A1* | 5/2003 | Tarquini et al. | 713/200 |
| 2003/0105658 A1* | 6/2003 | Chen et al. | 705/10 |
| 2003/0110393 A1* | 6/2003 | Brock et al. | 713/200 |
| 2003/0145225 A1* | 7/2003 | Bruton et al. | 713/201 |
| 2003/0149887 A1* | 8/2003 | Yadav | 713/200 |
| 2003/0159070 A1* | 8/2003 | Mayer et al. | 713/201 |
| 2005/0193218 A1* | 9/2005 | Susser et al. | 713/201 |
| 2006/0212572 A1* | 9/2006 | Afek et al. | 709/225 |
| 2007/0226789 A1* | 9/2007 | Boebert et al. | 726/11 |
| 2008/0016569 A1* | 1/2008 | Hammer et al. | 726/23 |
| 2009/0178111 A1* | 7/2009 | Moriconi et al. | 726/1 |
| 2010/0122317 A1* | 5/2010 | Yadav | 726/1 |
| 2012/0117640 A1* | 5/2012 | Ramsey et al. | 726/11 |

* cited by examiner

INTEGRATED NETWORK INTRUSION DETECTION

CROSS-REFERENCE TO RELATED U.S. PATENT APPLICATIONS

This application is a continuation application of U.S. application Ser. No. 12/649,018, entitled "INTEGRATED NETWORK INTRUSION DETECTION," filed Dec. 29, 2009 and now U.S. Pat. No. 8,752,173, which is a continuation application of U.S. application Ser. No. 11/702,908, entitled "INTEGRATED NETWORK INTRUSION DETECTION," filed Feb. 5, 2007, which is a continuation application of U.S. application Ser. No. 10/066,140, entitled "INTEGRATED NETWORK INTRUSION DETECTION," filed Feb. 1, 2002 and now U.S. Pat. No. 7,174,566.

BACKGROUND

The present application describes systems and techniques relating to network intrusion detection, for example, integrated network intrusion detection.

A machine network is a collection of nodes coupled together with wired and/or wireless communication links, such as coax cable, fiber optics and radio frequency bands. A machine network may be a single network or a collection of networks (e.g., an internetwork), and may use multiple networking protocols, including internetworking protocols (e.g., Internet Protocol (IP)). These protocols define the manner in which information is prepared for transmission through the network, and typically involve breaking data into segments generically known as packets (e.g., IP packets, ATM (Asynchronous Transfer Mode) cells) for transmission. A node may be any machine capable of communicating with other nodes over the communication links using one or more of the networking protocols.

These networking protocols are typically organized by a network architecture having multiple layers, where each layer provides communication services to the layer above it. A layered network architecture is commonly referred to as a protocol stack or network stack, where each layer of the stack has one or more protocols that provide specific services. The protocols may include shared-line protocols such as in Ethernet networks, connection-oriented switching protocols such as in ATM networks, and/or connectionless packet-switched protocols such as in IP.

As packets travel through a network, they are typically encapsulated within other packets multiple times. Encapsulation enables data to travel from a source process on one node to a destination process on another node, through multiple networks using different protocols and addressing schemes, without the two end nodes knowing anything about the intermediate addressing schemes and protocols.

Machine networks may provide powerful communication capabilities, but also may increase the difficulty of maintaining computer system security by making systems and data more accessible. Most networks are susceptible to attacks or improper use, both from inside and from outside the network. Attacks include attempts to gain unauthorized access to data, destroy or bring down a computer system, prevent others from accessing a system and attempts to take control of a system. For example, some network intrusions exploit application anomalies to gain access to a system and infect it with a computer virus, such as Code Red or Nimba.

A common technique used to improve network security is to install a firewall, which restricts and controls the flow of traffic between networks, typically between an enterprise network and the Internet. Firewalls typically monitor incoming and outgoing traffic and filter, redirect, repackage and/or discard packets. A firewall may serve as a proxy and may enforce an organization's security policies.

Frequently, network administrators employ systems to detect network intrusions to improve network security. Traditional network intrusion detection (NID) systems attempt to examine every packet on a network in order to detect intrusions. These NID systems may be implemented as standalone systems (e.g., NFR (Network Flight Recorder), provided by Cisco Systems, Inc. of San Jose, Calif.), or they may be implemented as distributed node-based systems (e.g., BlackICE, provided by Network Ice Corporation of San Mateo Calif.).

DRAWING DESCRIPTIONS

Figure 1:
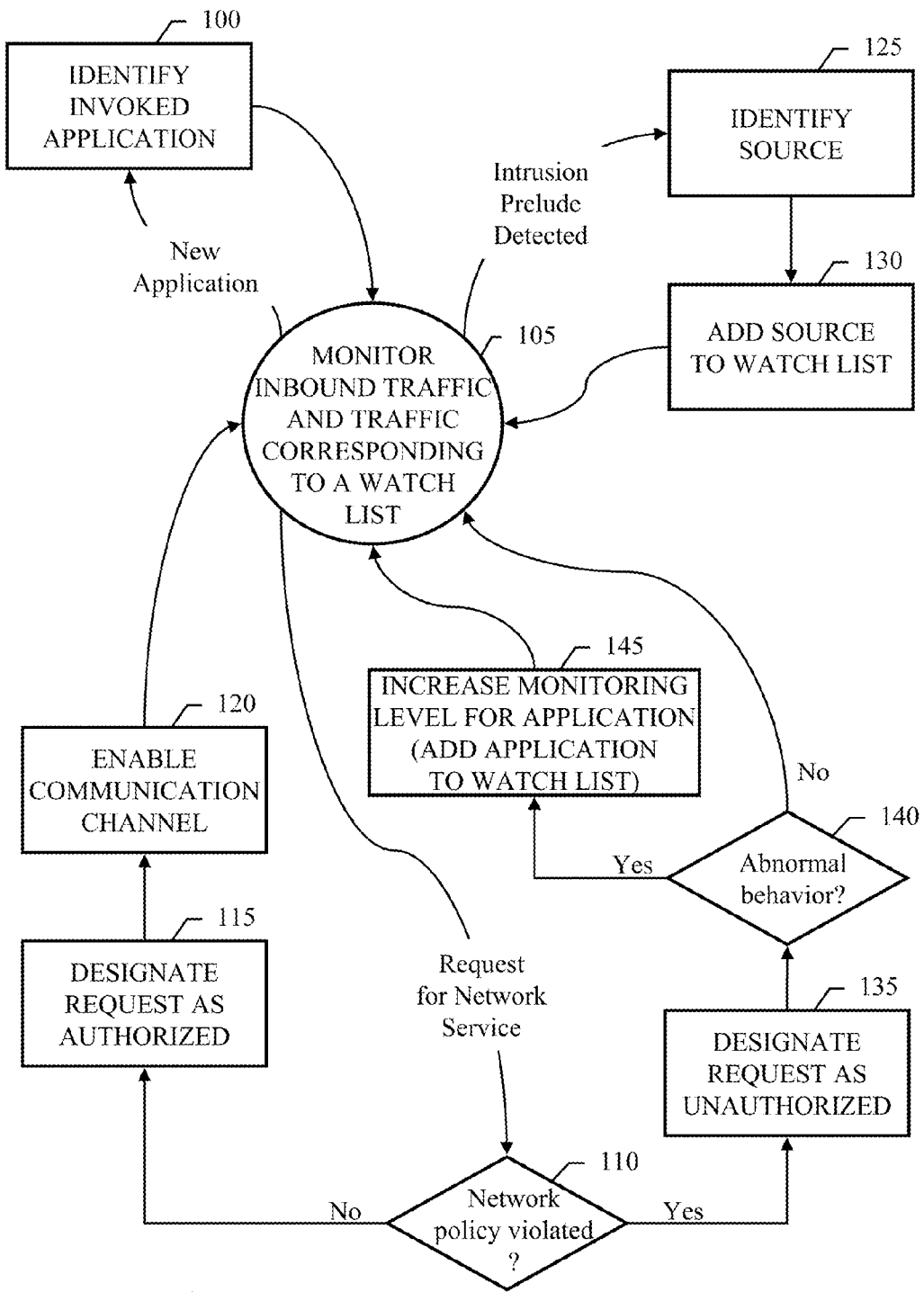
FIG. 1 is a combined flowchart and state diagram illustrating a method of monitoring network traffic to detect intrusions.

Details of one or more embodiments are set forth in the accompanying drawings and the description below. Other features and advantages may be apparent from the description and drawings, and from the claims.

DETAILED DESCRIPTION

The systems and techniques described here relate to integrated network intrusion detection. The description that follows frequently discusses intrusion detection in the context of IP networks, but the systems and techniques described apply equally to multiple types of machine communication networks and operating system environments.

As used herein, the term "application" means a software program, which is a collection of computing operations embodied by a set of instructions (e.g., one or more binary objects, one or more scripts, and/or one or more interpretable programs). The term "component" means a software program designed to operate with other components and/or applications. The term "process" means an executing software program. The term "execution context" means a set of processing cycles given to a process, such as a task in a multitasking operating system. Both an invoked application and an invoked component are a separate process, even if their functionality is interrelated and they share a single execution context. For example, an applet and a Web browser in which the applet runs are each a process. The term "applet" means a component designed specifically to be run from within an application. The term "thread" means a part of a software program that is given its own execution context.

The term "intrusion" means an attempt to break into and/or misuse a computing system. The term "intrusion prelude" means communication activities that typically precede an intrusion. The term "intrusion signature" means a communication pattern identified as corresponding to a known type of intrusion, including patterns that may be found in individual packets and patterns that may be gleaned from analyzing multiple packets.

The present inventor recognized the potential advantages of integrating firewall filtering information with network intrusion analysis. In typical network environments, most network traffic is legitimate and only a small portion of network communications may contain intrusions. By performing intrusion analysis on packets blocked by a firewall, intrusion preludes may be detected (including detection using fabricated responses to blocked network requests), and particular sources of network communications may be singled out for greater scrutiny. Thus, an overall amount of network traffic that needs to be monitored may be reduced, real-time intrusion detection may be improved, and more information about an intruder and the intruder's system and/or network may be obtained.

In addition, firewall functionality may be integrated with intrusion detection on end nodes (e.g., servers and hosts) in a network, such as an enterprise network, to further improve intrusion detection and network security. For example, a networked machine may include an intrusion detection system that functions in part as a dynamic firewall for the networked machine.

The intrusion detection system may include three components. The first component may be an application rule enforcer that authorizes network service requests from applications invoked on the networked machine and identifies abnormal behavior by an invoked application. The second component may be a network traffic enforcer that monitors inbound network communications and blocks those communications that fail to correspond to an authorized network service request. The third component may be an intrusion detector that monitors the blocked communications and identifies abnormal application behavior to determine when additional traffic monitoring is needed to detect an intrusion. Thus, the total number of communications (e.g., packets) that are examined may be reduced while intrusions may be detected more effectively.

FIG. 1 is a combined flowchart and state diagram illustrating a method of monitoring network traffic to detect intrusions. The method begins by identifying one or more applications invoked on a machine (100). This identification may be performed for an application by examining network communications generated by the application, system records for the application, and/or a set of instructions embodying the application.

Next a default state 105 is entered, in which inbound traffic (i.e., inbound network communications) and traffic corresponding to a watch list are monitored. These network communications are monitored to detect an intrusion prelude or an intrusion. Moreover, multiple levels of monitoring may be implemented in the default monitoring state 105.

When a new application is invoked, the new application is identified (100). When a request is received for network service (i.e., a network input/output (I/O) request) from an invoked application, a check is made as to whether the request violates a network policy (110). The network policy may include a system policy and/or an application-specific policy.

For example, the request may include information such as destination IP address, destination port, source port and type of request (e.g., bind, connect, accept, listen, send, receive, etc.). The network policy may include application-specific rules such as Application=Internet Explorer, destination port=Any, destination address=Any, source port=80, request=Listen, action=Allow. This rule states that the network policy allows any inbound traffic for the Internet Explorer application from any remote server through port 80. In addition to permissive rules that specify allowed communications, the network policy may also include restrictive rules that specify communications that are not allowed (e.g., a Deny action).

If the received request does not violate the network policy, the request is designated as authorized (115). Then, a communication channel for the request is enabled (120), and monitoring continues.

Rules similar to the policy rule above may be dynamically added to and removed from a network filter driver to open and close communication channels. Such filtering rules identify authorized network flows associated with invoked applications. In an IP network, a channel may be created by specifying an open channel for a network flow using five values: (1) source IP address, (2) source port, (3) destination IP address, (4) destination port, and (5) protocol. Additional and/or alternative values may be used to specify an open channel.

Following the creation of an open channel, inbound traffic that corresponds to the open channel is allowed, whereas inbound traffic that fails to correspond to an open channel is blocked in the monitoring state 105. Moreover, outbound traffic may also be monitored in the monitoring state 105, and disabled channels may also be created, such as by using the Deny action discussed above. Blocked traffic is monitored to detect an intrusion prelude, for example, a system scan, a port scan and/or an operating system (OS) fingerprinting. The blocked traffic may be checked for patterns that span multiple communications and/or multiple communication channels (e.g., multiple TCP/IP (Transmission Control Protocol/Internet Protocol) connections).

When an intrusion prelude is detected, a source of the intrusion prelude is identified (125). For example, a source IP addresses may be extracted from a packet that is part of the intrusion prelude. This source is then added to a watch list for increased monitoring (130), and monitoring continues. All packets from the identified source may then be monitored and these packets may be checked for intrusion signature(s). Additionally, multiple sources may be associated with each other, both in intrusion prelude detection and in subsequent intrusion detection, to counter distributed attacks.

If a received request violates the network policy, the request is designated as unauthorized (135). A determination is then made as to whether the application that generated the unauthorized request is behaving abnormally (140). This determination may be based on the number of unauthorized requests and/or on the severity of the unauthorized request generated by the application. For example, in one implementation, a single unauthorized request may be treated as abnormal behavior by an application. If the requesting application is behaving normally, monitoring continues.

When an application behaves abnormally, a level of monitoring for the application is increased (145), and monitoring continues. For example, the application may be added to a watch list to initiate monitoring of network communications both to and from the application. This monitoring may include searching packets for application-specific intrusion signatures.

Figure 2A:
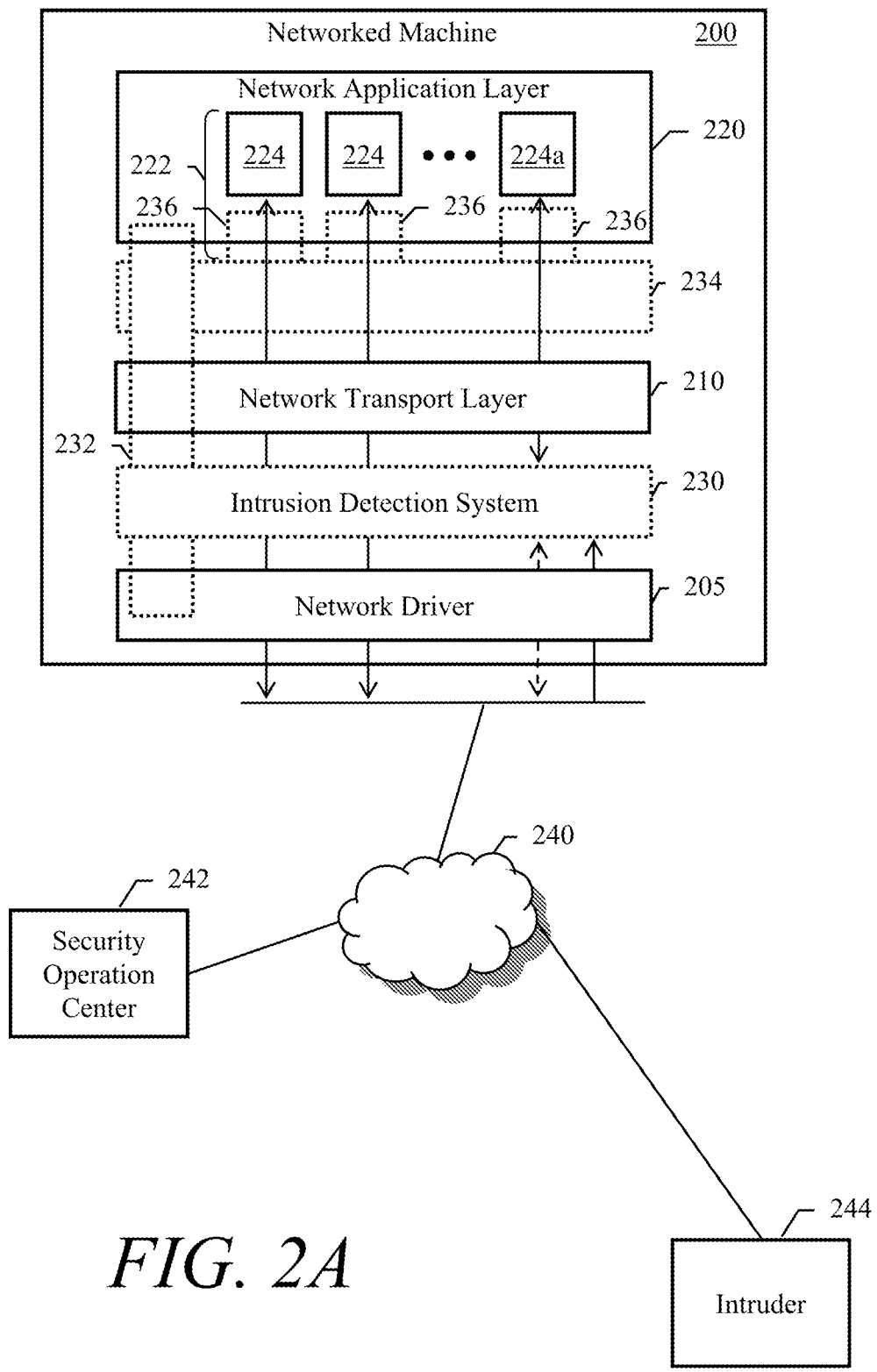
FIG. 2A is a block diagram illustrating a system implementing integrated network intrusion detection.

FIG. 2A is a block diagram illustrating a system implementing integrated network intrusion detection. A networked machine 200 includes a network stack, which is a set of layered software modules implementing a defined protocol stack. The number and composition of layers in the network stack will vary with machine and network architecture, but generally includes a network driver 205, a network transport layer 210 (e.g., TCP/IP) and an application layer 220.

An intrusion detection system (IDS) 230 may be implemented between the network driver 205 and the network transport layer 210 so that all incoming packets may be monitored. Packet-level intrusion detection may be implemented in an NDIS (Network Driver Interface Specification) intermediate driver in a Windows environment. In addition, the IDS 230 may have additional components 232 placed elsewhere in the network stack. System-level intrusion detection may be implemented in one or more TDI (Transport Driver Interface) filter drivers, and application-level intrusion detection may be implemented in one or more components placed just below and/or just inside the application layer 220 (i.e., as part of a network interface library).

If an application-level component 234 is used as part of the IDS 230, network services requested by applications 224 go to the application-level component 234 first. As a result, the application-level component 234 knows which application requested which network service. In a Windows operating system environment, the application-level component 234 may be implemented as a WinSock (Windows Socket) Layer Service Provider (LSP) and/or as a TDI filter driver. WinSock is an Application Programming Interface (API) for developing Windows programs that communicate over a network using TCP/IP.

Alternatively, or in addition, application-level components 236 may be used for intrusion detection. Such components 236 load and run with each new network application 224 in an execution context 222 for that network application. These components 236 may perform authorization of network requests and application-specific intrusion signature detection such that the processing time consumed by these techniques affects only corresponding network applications.

The networked machine 200 is coupled with a network 240 that may provide communication links to a security operation center 242 and a potential intruder 244. The security operation center 242 may include a central security server. Various alert levels may be used in the IDS 230. These alert levels may trigger heightened monitoring states, cause alerts to be sent to the security operation center 242, and/or initiate logging of network activity, locally and/or with the central security server, for later forensic analysis.

The IDS 230 functions as a dynamic firewall for the networked machine 200. The IDS 230 monitors network traffic to block traffic that violates a network policy and monitors blocked traffic to detect an intrusion prelude. The IDS 230 monitors traffic from the potential intruder 244 when an intrusion prelude is detected. The IDS 230 may track behavior of applications 224 using a network policy that specifies behavior criteria (which may be application-specific) to identify abnormal application behavior. The IDS 230 may monitor traffic from an abnormally behaving application 224*a* to identify an intrusion, including e.g. an intrusion connected with a Trojan Horse in the application.

Figure 2B:
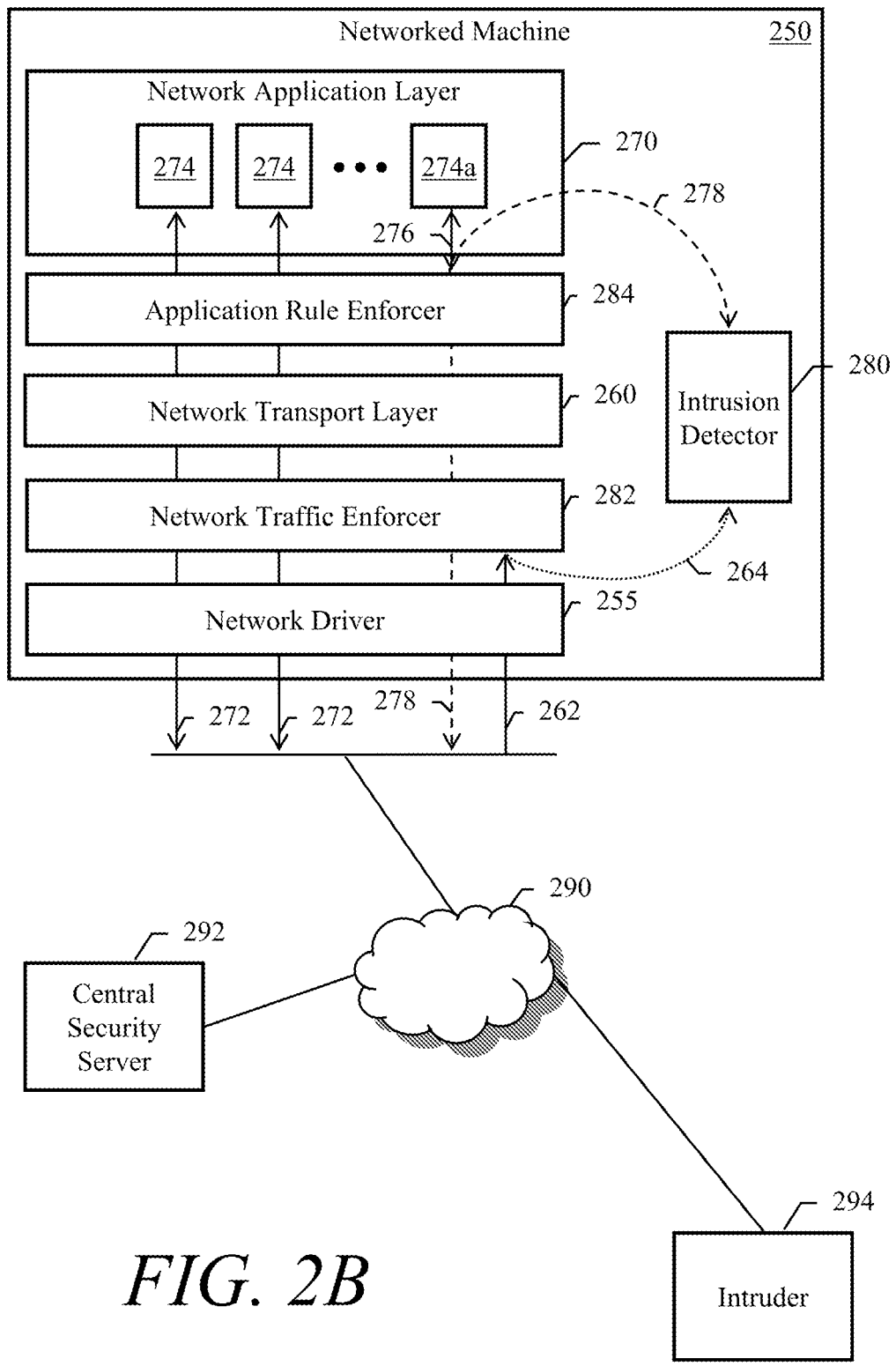
FIG. 2B is a block diagram illustrating another system implementing integrated network intrusion detection.

FIG. 2B is a block diagram illustrating a system implementing integrated network intrusion detection. A networked machine 250 includes a network stack, as described above, and generally includes a network driver 255, a network transport layer 260 (e.g., TCP/IP) and an application layer 270. The networked machine 250 also includes an intrusion detection system divided into three components: an intrusion detector 280, a network traffic enforcer 282, and an application rule enforcer 284.

These components 280, 282, 284 may reside in fewer or greater than three software modules. For example, the intrusion detector 280 may include a kernel component that resides in a first module with the network traffic enforcer 282, and the intrusion detector 280 also may include a user component that resides in a second module with the application rule enforcer 284. Additionally, the application rule enforcer 284 may be a component that is invoked separately with each of multiple invoked applications 274, as described above.

The networked machine 250 is coupled with a network 290 that may provide communication links to a central security server 292 and a potential intruder 294.

As each application 274 requests network I/O service, the request is either authorized or rejected by the application rule enforcer 284. If the request is authorized, corresponding authorized communications 272 are allowed to pass from the application 274 to the network 290, and from the network 290 to the application 274. If a request is rejected, this rejected request is communicated to the intrusion detector 280.

If a request 276 is rejected, the intrusion detector 280 may determine that an application 274*a* is behaving abnormally, and the intrusion detector 280 may then begin monitoring other communications 278 for the suspect application 274*a*. This additional monitoring of communications 278 may involve checking for application-specific intrusion signatures, which may be dynamically loaded from the central security server 292.

The network traffic enforcer 282 monitors incoming network traffic. If an inbound communication 262 fails to correspond to an authorized request (i.e., the inbound communication was not effectively pre-approved by the application rule enforcer), the communication is dropped (i.e., blocked from passage to another layer in the network stack). Additionally, the network traffic enforcer 282 may monitor outbound communications in a similar manner. For example, the network traffic enforcer 282 may check all packets (both from the network 290 and from the applications 274) to see if they match a channel opened by the application rule enforcer 284.

Moreover, the network traffic enforcer 282 may also drop other communications in a manner similar to a firewall. For example, the network traffic enforcer 282 may drop malformed packets and packets used for system scanning (e.g., ICMP (Internet Control Message Protocol) echo requests). Communications that are dropped by the network traffic enforcer are sent to the intrusion detector 280.

The intrusion detector 280 examines the dropped communications to look for patterns signaling an intrusion prelude. For example, the intrusion detector 280 may look for system scans (e.g., ping), port scans (e.g., TCP-SYN (synchronization), TCP-FIN (finished), etc.), and OS fingerprinting. Frequently an intruder 294 will perform scanning operations on a system, or make some missteps, before an intrusion is launched. These operations may be detected by the intrusion detector 280 as an intrusion prelude.

Additionally, the intrusion detector 280 may encourage these operations by generating fabricated responses to the dropped communications to catch the intruder 294. A fabricated response to blocked traffic may be used to gain knowledge about a potential intruder and their system for later use. For example, by selectively generating one or more fabricated responses to blocked inbound traffic, which would otherwise be blocked silently, significant information concerning a potential intruder's system and network may be obtained for use in later forensic analysis. If the potential intruder later turns out to be an actual intruder, this collected information may be associated with the detected intrusion and may be especially useful, such as for use in prosecution of the intruder and/or other legal action (e.g., legal action requiring an intruder's Internet Service Provider (ISP) to take action, such as denying future network services to the intruder).

When an intrusion prelude is detected, the intrusion detector 280 then identifies and registers a source address for the intruder 294 and begins examining communications from that source to detect an intrusion. For example, the intrusion detector 280 may watch traffic from a potential intruder to look for packet level exploits such as launching intrusions using packet fragments (e.g., tear drop, Boink, etc.). Thus, the intrusion detector 280 may support packet reassembly to detect fragmentation related intrusions.

If the intrusion detector 280 detects an intrusion (e.g., a packet exploit), it may block the traffic and/or report the intrusion to the central security server 292. Additionally, the intrusion detector 280 may log the communications associated with a detected intrusion and intrusion prelude for forensic analysis.

Figure 3:
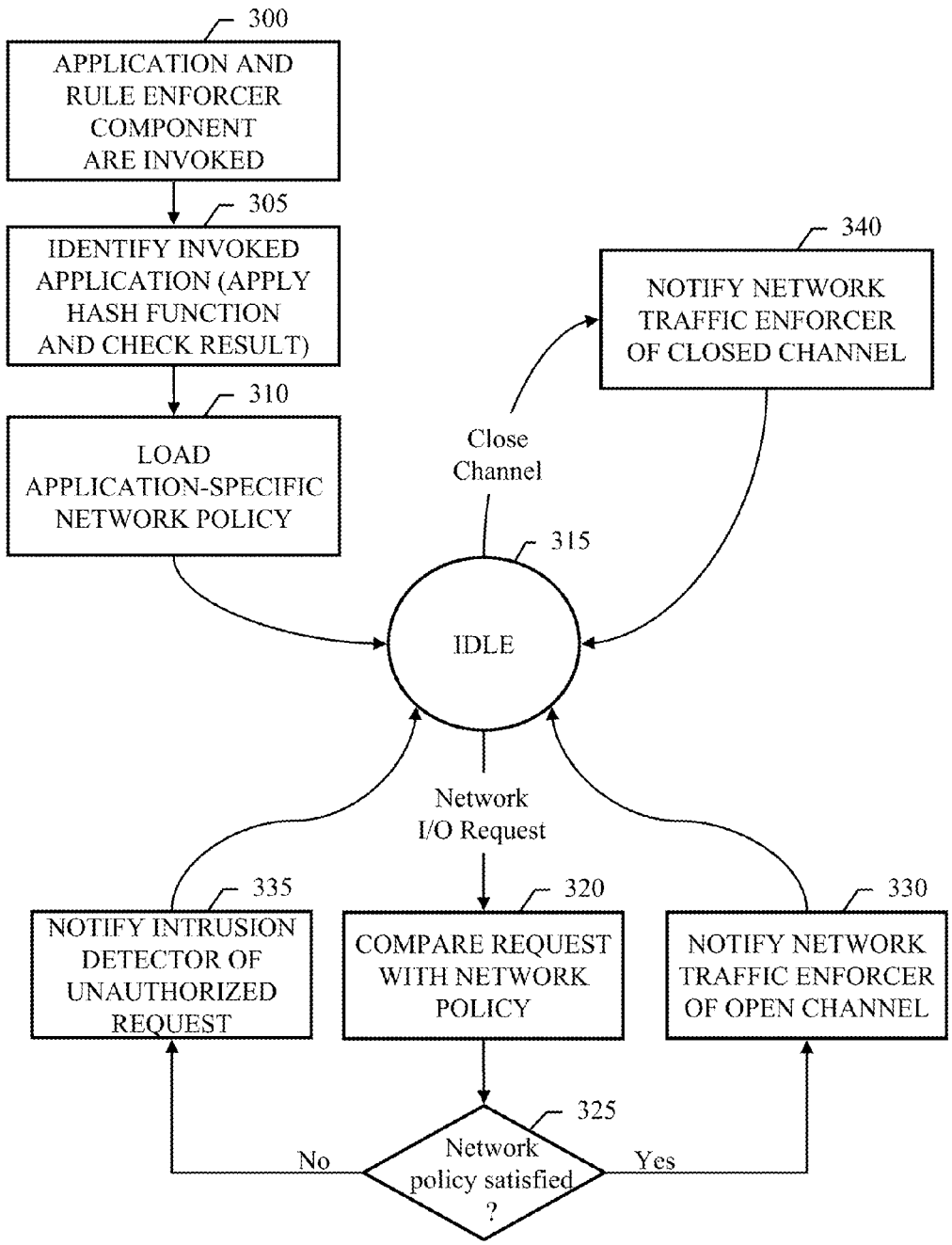
FIG. 3 is a combined flowchart and state diagram illustrating a method of servicing network requests in an application rule enforcer component of an integrated network intrusion detection system.

FIG. 3 is a combined flowchart and state diagram illustrating a method of servicing network requests in an application rule enforcer (ARE) component of an integrated network intrusion detection system. The method begins when an application and the ARE component are invoked (300). The ARE component then identifies the invoked application (305).

To do so, the ARE component may determine the full path (directory and file name) of the loading application executable (e.g., "C:/Program Files/Application/application.exe"), examine machine instructions embodying the application (e.g., "application.exe") to identify the application, and/or may crosscheck this identification with file properties information, such as name, size and version number. Examining the machine instructions may involve applying a hash function to the application's executable to generate a condensed representation (or hash value) of the executable. This hash value may then be compared with predefined hash values for known applications to identify the invoked application.

The hash function may be a message digest algorithm with a mathematical property that effectively guarantees that for any size message, a unique value of a fixed size (e.g., 128 bits) is returned. The hash function may be part of a standardized message digest specification (e.g., Secure Hash Standard (SHA-1), defined in Federal Information Processing Standards Publication 180-1).

Once the invoked application is identified, an application-specific network policy is loaded (310). This network policy information may be loaded from a local repository and/or from a remote repository of network policy information (including dynamic loading from the remote repository to the local repository to keep the network policy information up to date as network policies change). Then, the ARE component enters an idle state 315.

When a network I/O request is made by the application, the request is compared with the application-specific network policy (320). If the policy is satisfied (325), a network traffic enforcer (NTE) component is notified to open a channel (330). For example, a message may be sent specifying a source IP address, a source port, a destination IP address, a destination port and a protocol for the opened channel.

If the policy is not satisfied, an intrusion detector component is notified of the rejected request (335). Alternatively, the notice may be that the application is behaving abnormally. For example, a single violation of network policy may be considered abnormal behavior for the application. Alternatively, the application-specific network policy may be multi-tiered, such that certain violations are logged, but repeated and/or more severe violations of network policy constitute abnormal application behavior.

Such policies may include configurable thresholds for one or more characteristics of network communications. The configurable thresholds may be set directly by the intrusion detector, and/or by a network administrator, after analysis of communication statistics for the application. Thus, network administrators may set the configurable thresholds, such as by including them with intrusion signatures provided by security service providers, and/or the configurable thresholds may be auto-configurable, such as by monitoring communications during a defined time window.

When an open channel is closed, the NTE component is notified of this closing channel (340).

Figure 4:
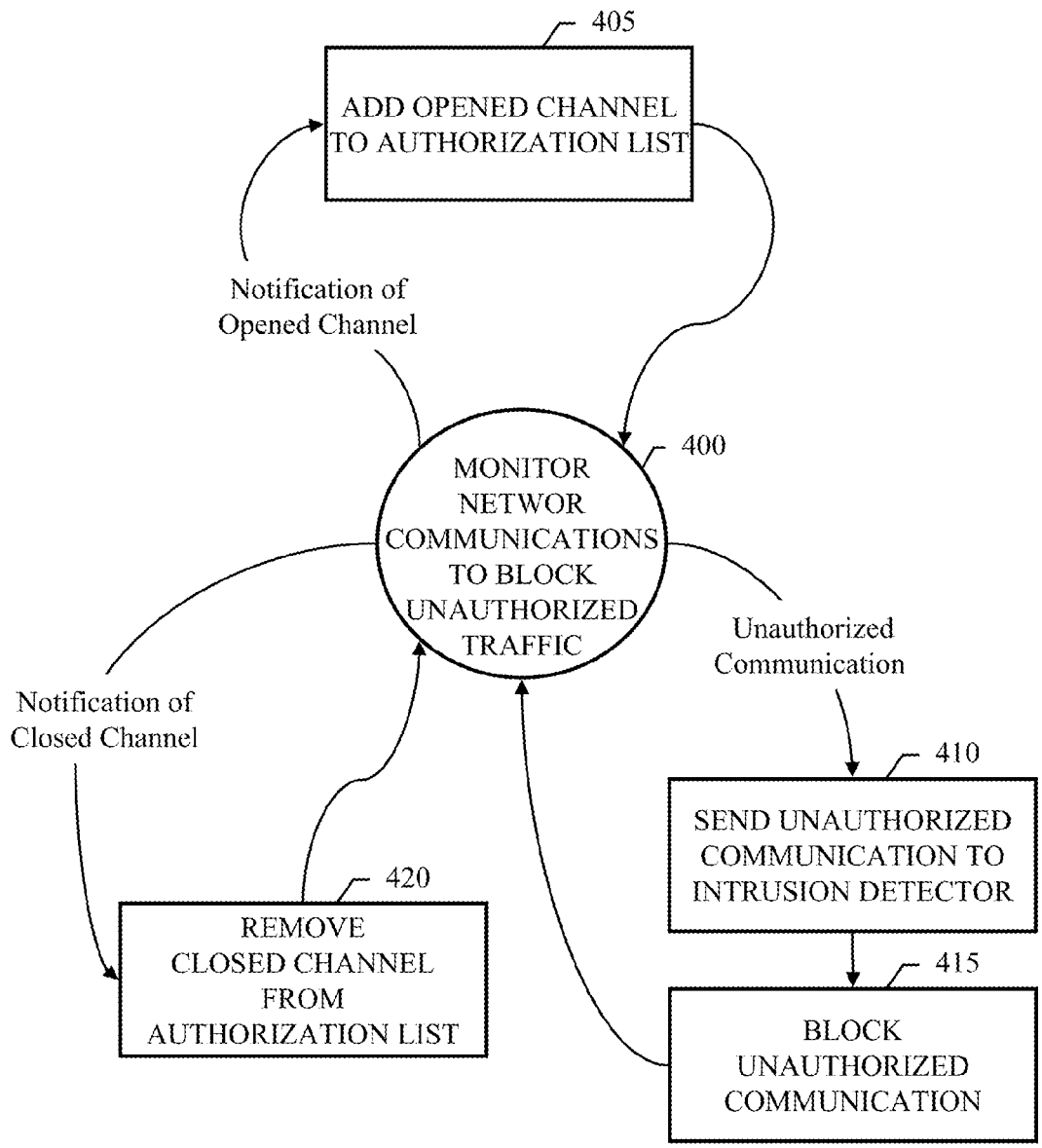
FIG. 4 is a combined flowchart and state diagram illustrating a method of filtering network communications in a network traffic enforcer component of an integrated network intrusion detection system.

FIG. 4 is a combined flowchart and state diagram illustrating a method of filtering network communications in a network traffic enforcer (NTE) component of an integrated network intrusion detection system. The method begins in a monitoring state 400, where communications are monitored to block unauthorized communications. When a notification of an opened channel is received, the opened channel is added to an authorization list (405), and monitoring continues.

When an unauthorized communication is received, a copy of the communication is sent to an intrusion detector component (410). Then the unauthorized communication is blocked (i.e., dropped) (415), and monitoring continues. When a notification of a closed channel is received, the closed channel is removed from the authorization list (420), and monitoring continues. Thus, network communications that have not been pre-approved by the ARE component are blocked and copied to the intrusion detector.

Figure 5A:
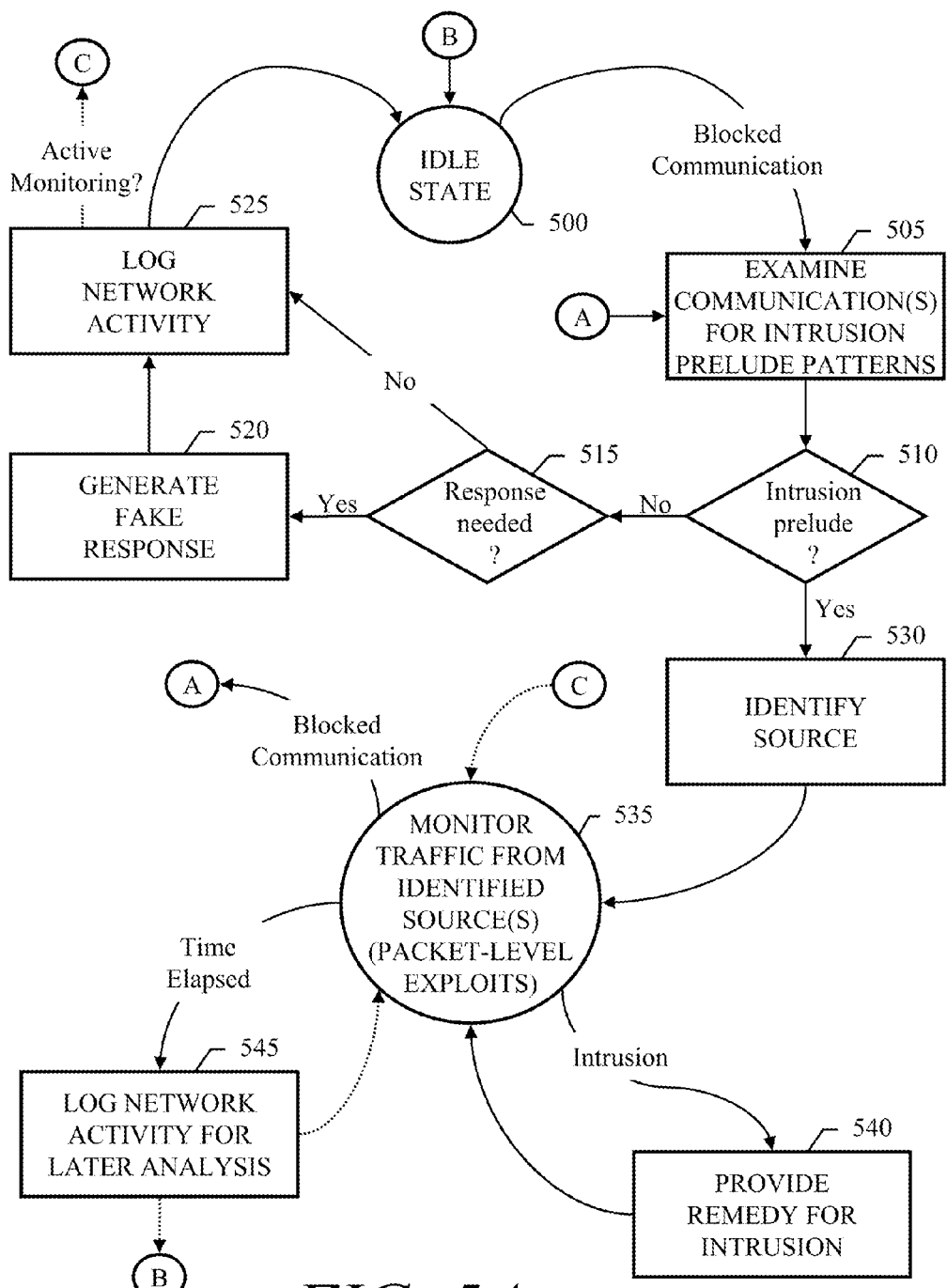
FIG. 5A is a combined flowchart and state diagram illustrating a method of detecting intrusion preludes and intrusions in a first detector component of an integrated network intrusion detection system.

FIG. 5A is a combined flowchart and state diagram illustrating a method of detecting intrusion preludes and intrusions in a first detector component of an integrated network intrusion detection system. The method begins in an idle state 500. When a blocked communication is received, it is checked for intrusion prelude patterns (505). Such patterns may include system scan, port scan and OS fingerprinting.

A check is made to determine if an intrusion prelude is present (510). If not, a check is made to determine if a response is needed to encourage an intruder (515). If so, a fabricated response is generated and sent to the potential intruder (520). Then, or if a fabricated response was not needed, the present communication activity is logged for future use in detecting intrusion preludes (525).

If an intrusion prelude is detected, the source of the intrusion prelude is identified (530). The identified source is a potential intruder, and thus communications from the potential intruder are monitored in an active monitoring state 535. This active monitoring may involve checking for packet level exploits, such as intrusions using packet fragments, as described above. When a blocked communication is received, it is checked for intrusion prelude patterns, as before (505). Thus, additional sources may be added to a list of potential intruders to be monitored in the active monitoring state 535.

If an intrusion is detected, a remedy is provided (540). For example, the intrusion activity may be logged, the traffic may be cut, countermeasures may be employed and/or an alert may be sent to a security operation center.

If a pre-defined time elapses for an identified source, the monitored activity for the source is logged for later analysis, and the source-specific monitoring for that source is terminated (545). If this is the last source being monitored in the active monitoring state 535, the method returns to the idle state 500.

Figure 5B:
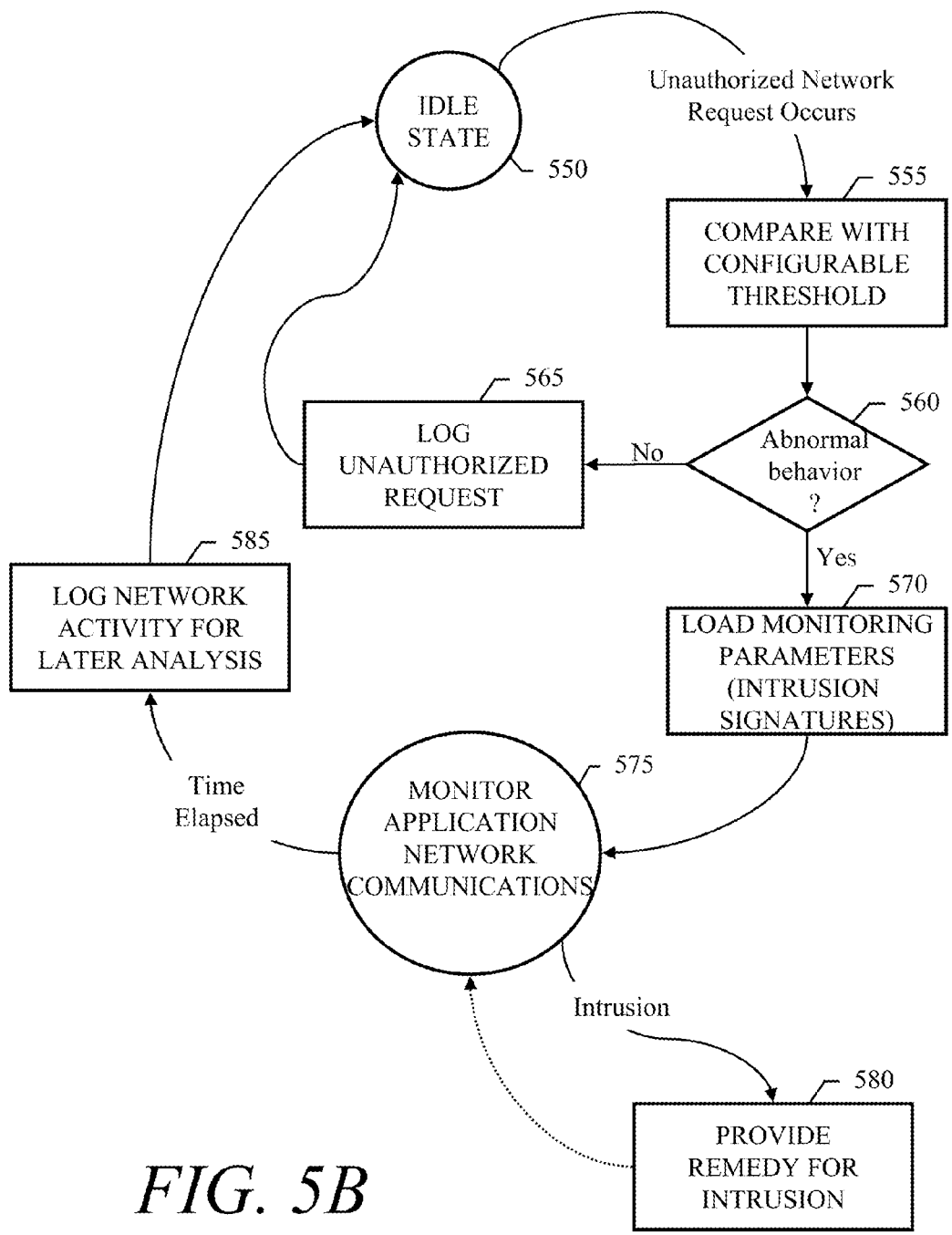
FIG. 5B is a combined flowchart and state diagram illustrating a method of detecting intrusions in a second detector component of an integrated network intrusion detection system.

FIG. 5B is a combined flowchart and state diagram illustrating a method of detecting intrusions in a second detector component of an integrated network intrusion detection system. The method begins in an idle state 550. When an unauthorized request occurs, the unauthorized request is compared with one or more configurable thresholds (555). These configurable thresholds specify the type and/or number of requests that constitute abnormal application behavior. The configurable thresholds may be set as described above.

A check is then made for abnormal behavior (560). If the application is not behaving abnormally, the unauthorized request is logged for later use (565). If the application is behaving abnormally, monitoring parameters for the application are loaded (570). These parameters may include application-specific intrusion detection signatures.

Then, a monitoring state 575 is entered, in which network communications for the application are monitored using the loaded parameters. If an intrusion is detected, a remedy is provided (580). For example, the intrusion activity may be logged, the traffic may be cut, countermeasures may be taken, and/or an alert may be sent to a security operation center. This remedy may be application-specific.

If a predefined time elapses, in which no intrusion is detected, the monitored communications for the application are logged for later analysis (585). Then, the method returns to the idle state 550.

Although FIGS. 3 to 5C show methods being performed in four separate components, these methods may also be combined into a single component or two or more components. For example, a first component, being a combination of the NTE component and the first intrusion detector component, may perform a combination of the methods shown in FIGS. 4 and 5A. A second component, being a combination of the ARE component and the second intrusion detector component, may perform a combination of the methods shown in FIGS. 3 and 5B.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable/interpretable on a programmable system including at least one programmable processor, which may be special or general purpose, coupled to receive data and instructions from, and to transmit data and instructions to, a storage system, at least one input device, and at least one output device.

Figure 6:
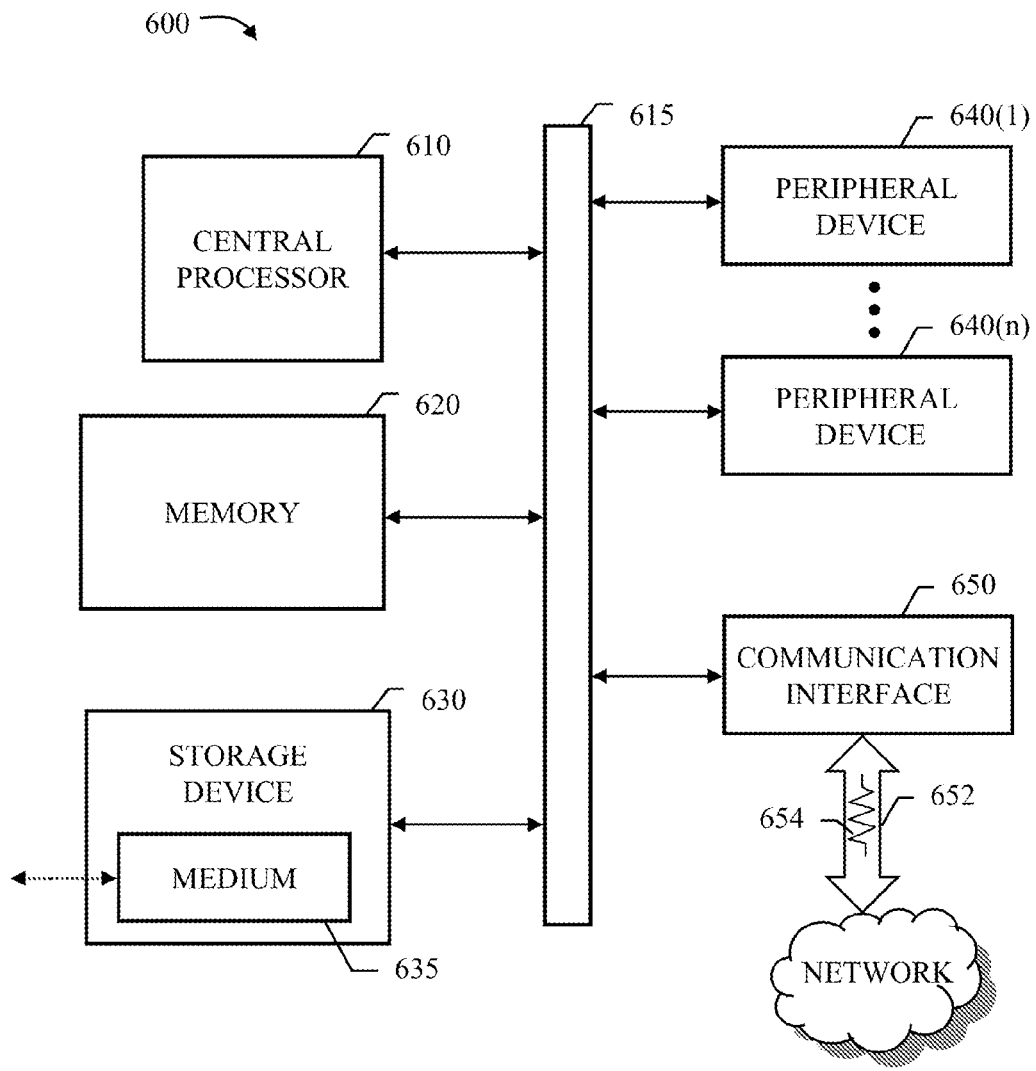
FIG. 6 is a block diagram illustrating an example data processing system.

FIG. 6 is a block diagram illustrating an example data processing system 600. The data processing system 600 includes a central processor 610, which executes programs, performs data manipulations and controls tasks in the system 600, thereby enabling the features and function described above. The central processor 610 is coupled with one or more communication busses 615.

The data processing system 600 includes a memory 620, which may be volatile and/or non-volatile memory, and is coupled with the communications bus 615. The system 600 may also include one or more cache memories. These memory devices enable storage of instructions and data close to the central processor 610 for retrieval and execution.

The data processing system 600 may include a storage device 630 for accessing a medium 635, which may be removable. The medium 635 may be read-only or read/write media and may be magnetic-based, optical-based or magneto-optical-based media. The data processing system 600 may also include one or more peripheral devices 640(1)-640(n) (collectively, devices 640), and one or more controllers and/or adapters for providing interface functions. The devices 640 may be additional storage devices and media as described above, other storage interfaces and storage units, input devices and/or output devices.

The system 600 may further include a communication interface 650, which allows software and data to be transferred, in the form of signals 654 over a channel 652, between the system 600 and external devices, networks or information sources. The signals 654 may embody instructions for causing the system 600 to perform operations. The communication interface 650 may be a network interface designed for a particular type of network, protocol and channel medium, or may be designed to serve multiple networks, protocols and/or channel media.

The system 600 represents a programmable machine, and may include various devices such as embedded controllers and Programmable Logic Devices (PLDs). Machine instructions (also known as programs, software, software applications or code) may be stored in the machine 600 or delivered to the machine 600 over a communication interface. These instructions, when executed, enable the machine 600 to perform the features and function described above.

As used herein, the term "machine-readable medium" refers to any medium or device used to provide machine instructions and/or data to the machine 600. The various implementations described above have been presented by way of example only, and not limitation. Thus, other embodiments may be within the scope of the following claims.

The invention claimed is:

1. A method comprising:
   determining, by an application rule enforcer component of a machine, whether a request for access to network services from an invoked application violates an application-specific network policy associated with the invoked application;
   blocking, by a network traffic enforcer component of the machine, network packets for the invoked application in response to determining that the request violates the application-specific network policy;
   analyzing, by an intrusion detector component of the machine, the blocked network packets to detect a network intrusion;
   determining, by the intrusion detector component, whether the invoked application is behaving abnormally;
   loading, by the intrusion detector component, application-specific monitoring parameters for the invoked application in response to determining that the invoked application is behaving abnormally; and
   checking, by the intrusion detector component, network packets for the invoked application based on the loaded application-specific monitoring parameters.

2. The method of claim 1, further comprising:
   generating, by the intrusion detector component in response to blocking the network packets, communications to encourage at least one of further network packets to the invoked application or further network packets from the invoked application.

3. The method of claim 1, wherein analyzing the blocked network packets to detect a network intrusion comprises analyzing the blocked network packets to detect an intrusion prelude.

4. The method of claim 1, wherein the application-specific monitoring parameters comprise application-specific intrusion signatures for the invoked application.

5. The method of claim 1, further comprising copying, by the network traffic enforcer component, the blocked network packets to the intrusion detector component in response to blocking the network packets for the invoked application;
wherein analyzing the blocked network packets comprises analyzing, by the intrusion detector component, the copies of the blocked network packets to detect a network intrusion.

6. The method of claim 1, further comprising loading the application-specific monitoring parameters from a central security server in response to determining that the invoked application is behaving abnormally.

7. One or more non-transitory, computer-readable storage media comprising a plurality of instructions that in response to being executed cause a machine to:
determine whether a request for access to network services from an invoked application violates an application-specific network policy associated with the invoked application;
block network packets for the invoked application in response to determining that the request violates the application-specific network policy;
analyze the blocked network packets to detect a network intrusion;
determine whether the invoked application is behaving abnormally;
load application-specific monitoring parameters for the invoked application in response to determining that the invoked application is behaving abnormally; and
check network packets for the invoked application based on the loaded application-specific monitoring parameters.

8. The one or more non-transitory, computer-readable storage media of claim 7, further comprising a plurality of instructions that in response to being executed cause the machine to:
generate, in response to blocking the network packets, communications to encourage at least one of further network packets to the invoked application or further network packets from the invoked application.

9. The one or more non-transitory, computer-readable storage media of claim 7, wherein to analyze the blocked network packets to detect a network intrusion comprises to analyze the blocked network packets to detect an intrusion prelude.

10. The one or more non-transitory, computer-readable storage media of claim 7, wherein the application-specific monitoring parameters comprise application-specific intrusion signatures for the invoked application.

11. The one or more non-transitory, computer-readable storage media of claim 7, further comprising a plurality of instructions that in response to being executed cause the machine to load the application-specific monitoring parameters from a central security server in response to determining that the invoked application is behaving abnormally.

12. A machine comprising:
a memory;
a processor;
a communication interface coupled with the processor;
an application rule enforcer component to determine whether a request for access to network services from an invoked application violates an application-specific network policy associated with the invoked application;
a network traffic enforcer component to block network packets for the invoked application in response to a determination that the request violates the application-specific network policy; and
an intrusion detector component to:
analyze the blocked network packets to detect a network intrusion;
determine whether the invoked application is behaving abnormally;
load application-specific monitoring parameters for the invoked application in response to a determination that the invoked application is behaving abnormally; and
check network packets for the invoked application based on the loaded application-specific monitoring parameters.

13. The machine of claim 12, wherein the intrusion detector component is further to:
generate, in response to blocking of the network packets, communications to encourage at least one of further network packets to the invoked application or further network packets from the invoked application.

14. The machine of claim 12, wherein to analyze the blocked network packets to detect a network intrusion comprises to analyze the blocked network packets to detect an intrusion prelude.

15. The machine of claim 12, wherein the application-specific monitoring parameters comprise application-specific intrusion signatures for the invoked application.

16. The machine of claim 12, wherein the intrusion detector component is further to load the application-specific monitoring parameters from a central security server in response to the determination that the invoked application is behaving abnormally.

17. A machine comprising:
a memory;
a processor;
a communication interface coupled with the processor;
an application rule enforcer component to determine whether a request for access to network services from an invoked application violates an application-specific network policy associated with the invoked application;
a network traffic enforcer component to block network packets for the invoked application in response to a determination that the request violates the application-specific network policy; and
an intrusion detector component to:
analyze the blocked network packets to detect a network intrusion, wherein the intrusion detector component is invoked with the invoked application;
determine whether the invoked application is behaving abnormally;
load application-specific monitoring parameters for the invoked application in response to a determination that the invoked application is behaving abnormally; and
check network packets for the invoked application based on the loaded application-specific monitoring parameters.

18. The machine of claim 17, wherein the machine is further to execute the intrusion detector component and the application within a single execution context.

19. One or more non-transitory, computer-readable storage media comprising a plurality of instructions that in response to being executed cause a machine to:
determine whether a request for access to network services from an invoked application violates an application-specific network policy associated with the invoked application;

block network packets for the invoked application in response to determining that the request violates the application-specific network policy;

analyze the blocked network packets by an intrusion detector component to detect a network intrusion, wherein the intrusion detector component is invoked with the invoked application;

determine whether the invoked application is behaving abnormally;

load application-specific monitoring parameters for the invoked application in response to determining that the invoked application is behaving abnormally; and check network packets for the invoked application based on the loaded application-specific monitoring parameters.

20. The one or more non-transitory, computer-readable storage media of claim 19, further comprising a plurality of instructions that in response to being executed cause the machine to execute the intrusion detector component and the application within a single execution context.

* * * * *